United States Patent
Dalrymple et al.

(10) Patent No.: US 7,117,942 B2
(45) Date of Patent: Oct. 10, 2006

(54) METHODS USEFUL FOR CONTROLLING FLUID LOSS DURING SAND CONTROL OPERATIONS

(75) Inventors: Eldon D. Dalrymple, Duncan, OK (US); Larrry S. Eoff, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 189 days.

(21) Appl. No.: 10/881,198

(22) Filed: Jun. 29, 2004

(65) Prior Publication Data
US 2005/0284632 A1 Dec. 29, 2005

(51) Int. Cl.
*E21B 43/04* (2006.01)
(52) U.S. Cl. ...................................... 166/278; 166/279
(58) Field of Classification Search ..................... None
See application file for complete search history.

(56) References Cited

U.S. PATENT DOCUMENTS

| | | | |
|---|---|---|---|
| 2,863,832 A | 12/1958 | Perrine | 252/8.55 |
| 2,910,436 A | 10/1959 | Fatt et al. | 252/8.55 |
| 3,215,199 A | 11/1965 | Dilgren | 166/38 |
| 3,251,415 A | 5/1966 | Bombardieri et al. | 166/42 |
| 3,297,090 A | 1/1967 | Dilgren | 166/38 |
| 3,307,630 A | 3/1967 | Dilgren et al. | 166/38 |
| 3,382,924 A | 5/1968 | Veley et al. | 166/42 |
| 3,434,971 A | 3/1969 | Atkins | 252/8.55 |
| 3,441,085 A | 4/1969 | Gidley | 166/307 |
| 3,451,818 A | 6/1969 | Wareham | 96/78 |
| 3,744,566 A | 7/1973 | Szabo et al. | 166/275 |
| 3,910,862 A | 10/1975 | Barabas et al. | 260/79.3 MU |
| 4,129,183 A | 12/1978 | Kalfoglou | 166/300 |
| 4,142,595 A | 3/1979 | Anderson et al. | 175/72 |
| 4,152,274 A | 5/1979 | Phillips et al. | 876/296 |
| 4,158,521 A | 6/1979 | Anderson et al. | 405/264 |
| 4,158,726 A | 6/1979 | Kamada et al. | 526/200 |
| 4,299,710 A | 11/1981 | Dupre et al. | 252/8.5 A |
| 4,366,071 A | 12/1982 | McLaughlin et al. | 252/8.55 R |
| 4,366,072 A | 12/1982 | McLaughlin et al. | 252/8.55 R |
| 4,366,073 A | 12/1982 | McLaughlin et al. | 252/8.55 R |
| 4,366,074 A | 12/1982 | McLaughlin et al. | 252/8.55 R |
| 4,374,739 A | 2/1983 | McLaughlin et al. | 252/8.55 R |
| 4,393,939 A | 7/1983 | Smith et al. | 166/293 |
| 4,395,340 A | 7/1983 | McLaughlin | 252/8.55 D |
| 4,401,789 A | 8/1983 | Gideon | 524/827 |
| 4,439,334 A | 3/1984 | Borchardt | 252/8.55 R |
| 4,440,649 A | 4/1984 | Loftin et al. | 252/8.5 C |
| 4,447,342 A | 5/1984 | Borchardt et al. | 252/8.55 D |
| 4,460,627 A | 7/1984 | Weaver et al. | 427/212 |
| 4,462,718 A | 7/1984 | McLaughlin et al. | 405/264 |
| 4,532,052 A | 7/1985 | Weaver et al. | 252/8.55 R |
| 4,536,297 A | 8/1985 | Loftin et al. | 252/8.5 C |
| 4,536,303 A | 8/1985 | Borchardt | 252/8.55 R |
| 4,536,305 A | 8/1985 | Borchardt et al. | 252/8.55 R |
| 4,552,670 A | 11/1985 | Lipowski et al. | 704/553 |
| 4,554,081 A | 11/1985 | Borchardt et al. | 252/8.5 A |
| 4,563,292 A | 1/1986 | Borchardt | 252/8.55 R |
| 4,604,216 A | 8/1986 | Irvin et al. | 252/8.51 |
| 4,627,926 A | 12/1986 | Peiffer et al. | 252/8.55 R |
| 4,671,883 A | 6/1987 | Connell | 252/8.515 |
| 4,693,639 A | 9/1987 | Hollenbeak et al. | 405/263 |
| 4,699,722 A | 10/1987 | Dymond et al. | 252/8.551 |
| 4,730,028 A | 3/1988 | Bock et al. | 526/225 |
| 4,814,096 A | 3/1989 | Evani | 252/8.554 |
| 4,828,726 A | 5/1989 | Himes et al. | 252/8.553 |
| 4,959,432 A | 9/1990 | Fan et al. | 526/287 |
| 5,051,197 A * | 9/1991 | Kalfayan et al. | 507/234 |
| 5,071,934 A | 12/1991 | Peiffer | 526/307 |
| 5,097,904 A | 3/1992 | Himes | 166/294 |
| 5,146,986 A | 9/1992 | Dalrymple | 166/294 |
| 5,160,642 A | 11/1992 | Schield et al. | 252/8.551 |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,382,371 A | 1/1995 | Stahl et al. | 507/221 |
| 5,597,783 A | 1/1997 | Audibert et al. | 507/120 |
| 5,607,902 A | 3/1997 | Smith et al. | 507/120 |

(Continued)

FOREIGN PATENT DOCUMENTS

DE    2 250 552    4/1974

(Continued)

OTHER PUBLICATIONS

U.S. Appl. No. 11/183,028, filed Jul. 15, 2005, Nguyen et al.

(Continued)

Primary Examiner—Frank S. Tsay
(74) Attorney, Agent, or Firm—Robert A. Kent; Baker Botts

(57) ABSTRACT

The present invention relates to methods useful during sand control operations and, more particularly, to using water-soluble relative permeability modifiers that are useful for controlling fluid loss during sand control operations. In one embodiment, the present invention provides a method of providing fluid loss control during sand control operations comprising introducing a fluid that comprises a water-soluble relative permeability modifier into a well bore; and stabilizing unconsolidated formation particulates in a section of a subterranean formation penetrated by the well bore. In other embodiments, the present invention provides methods of providing fluid loss control during sand control operations and methods of reducing fluid loss from carrier fluids used in sand control operations.

61 Claims, No Drawings

U.S. PATENT DOCUMENTS

| | | | | |
|---|---|---|---|---|
| 5,637,556 | A | 6/1997 | Argillier et al. | 507/120 |
| 5,646,093 | A | 7/1997 | Dino | 507/209 |
| 5,669,456 | A | 9/1997 | Audibert et al. | 175/72 |
| 5,720,347 | A | 2/1998 | Audibert et al. | 166/294 |
| 5,728,653 | A | 3/1998 | Audibert et al. | 507/222 |
| 5,735,349 | A | 4/1998 | Dawson et al. | 166/290 |
| 5,887,653 | A | 3/1999 | Bishop et al. | 166/281 |
| 5,944,106 | A | 8/1999 | Dalrymple et al. | 166/281 |
| 5,972,848 | A | 10/1999 | Audibert et al. | 507/119 |
| 5,979,557 | A | 11/1999 | Card et al. | 166/300 |
| 6,020,289 | A | 2/2000 | Dymond | 507/120 |
| 6,070,664 | A | 6/2000 | Dalrymple et al. | 166/281 |
| 6,124,245 | A | 9/2000 | Patel | 507/120 |
| 6,187,839 | B1 | 2/2001 | Eoff et al. | 523/130 |
| 6,209,646 | B1* | 4/2001 | Reddy et al. | 166/300 |
| 6,228,812 | B1 | 5/2001 | Dawson et al. | 507/221 |
| 6,237,687 | B1 | 5/2001 | Barbee, Jr. et al. | 166/278 |
| 6,253,851 | B1 | 7/2001 | Schroeder, Jr. et al. | 166/278 |
| 6,277,900 | B1 | 8/2001 | Oswald et al. | 523/130 |
| 6,283,210 | B1 | 9/2001 | Soliman et al. | 166/270 |
| 6,359,047 | B1 | 3/2002 | Thieu et al. | 524/376 |
| 6,364,016 | B1 | 4/2002 | Dalrymple et al. | 166/270 |
| 6,380,137 | B1 | 4/2002 | Heier et al. | 507/121 |
| 6,476,169 | B1 | 11/2002 | Eoff et al. | 523/307.2 |
| 6,476,283 | B1 | 11/2002 | Devore et al. | 585/250 |
| 6,497,283 | B1 | 12/2002 | Eoff et al. | 166/293 |
| 6,516,885 | B1 | 2/2003 | Munday | 166/295 |
| 6,569,983 | B1 | 5/2003 | Treybig et al. | 528/102 |
| 6,609,578 | B1 | 8/2003 | Patel et al. | 175/64 |
| 6,627,719 | B1 | 9/2003 | Whipple et al. | 774/325 |
| 6,710,107 | B1 | 3/2004 | Audibert et al. | 524/5 |
| 6,767,869 | B1* | 7/2004 | DiLullo et al. | 507/244 |
| 6,787,506 | B1 | 9/2004 | Blair et al. | 507/222 |
| 6,803,348 | B1 | 10/2004 | Jones et al. | 507/221 |
| 6,855,672 | B1 | 2/2005 | Poelker | 507/225 |
| 6,981,552 | B1* | 1/2006 | Reddy et al. | 166/294 |
| 7,007,752 | B1* | 3/2006 | Reddy et al. | 166/285 |
| 2003/0019627 | A1 | 1/2003 | Qu et al. | 166/281 |
| 2003/0104948 | A1 | 6/2003 | Poelker et al. | 507/100 |
| 2003/0191030 | A1 | 10/2003 | Blair et al. | 507/225 |
| 2004/0045712 | A1 | 3/2004 | Eoff et al. | 166/293 |
| 2004/0102331 | A1 | 5/2004 | Chan et al. | 507/100 |
| 2004/0171495 | A1 | 9/2004 | Zamora et al. | 507/100 |
| 2004/0220058 | A1 | 11/2004 | Eoff et al. | 507/200 |
| 2004/0229756 | A1 | 11/2004 | Eoff et al. | 507/219 |
| 2004/0229757 | A1 | 11/2004 | Eoff et al. | 507/219 |
| 2005/0000694 | A1 | 1/2005 | Dalrymple et al. | 166/307 |
| 2005/0230116 | A1 | 10/2005 | Eoff et al. | |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2335428 A | 9/1999 |
| WO | WO 93/15164 | 8/1993 |
| WO | WO 99/49183 | 9/1999 |
| WO | WO 99/50530 | 10/1999 |
| WO | WO 2000/78890 | 12/2000 |
| WO | WO 02/097236 A1 | 12/2002 |
| WO | WO 2003/056130 | 7/2003 |
| WO | WO 04/101706 A1 | 11/2004 |
| WO | WO 2004/094781 | 11/2004 |

OTHER PUBLICATIONS

Xu, et al.., Modeling of Laser Spallation Drilling of Rocks for Gas-and Oilwell Drilling, SPE 95746, 2005.

Gahan, et al., Effect of Downhole Pressure Conditions on High-Power Laser Perforation, SPE 97093, 2005.

Gahan, et al., Analysis of Efficient High-Power Fiber Lasers of Well Perforation, SPE 90661, 2004.

Parker, et al., Well Perforation Using High-Power Lasers, SPE 84418, 2003.

Parker, et al., Laser Drilling: Effects of Beam Application Methods on Improving Rock Removal, SPE 84353, 2003.

Bai, et al., Improved Determination of Stree-Dependent Permeability for Anisotropic Formations, SPE 78188, 2002.

Proett, et al., Advanced Permeability and Anisotropy Measurements While Testing and Sampling in Real-Time Using a Dual Probe Formation Tester, SPE 62919, 2000.

Proett, et al., Advanced Dual Probe Formation Tester With Transient, Harmonic, and Pulsed Time-Delay Testing Methods Determines Permeability, Skin and Anisotropy, SPE 64650, 2000.

U.S. Appl. No. 10/872,997, filed Jun. 21, 2004, Eoff et al.
U.S. Appl. No. 10/881,198, filed Jun. 29, 2004, Dalrymple et al.
U.S. Appl. No. 10/893,210, filed Jul. 16, 2004, Eoff et al.
U.S. Appl. No. 11/102,062, filed Apr. 8, 2005, Sierra et al.
U.S. Appl. No. 10/763,800, filed Jan. 24, 2004, Eoff et al.
U.S. Appl. No. 10/780,995, filed Feb. 18, 2004, Eoff et al.
U.S. Appl. No. 10/806,894, filed Mar. 23, 2004, Eoff et al.
U.S. Appl. No. 10/825,001, filed Apr. 15, 2004, Eoff et al.

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cgi?paper=00068973.pdf.

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.

Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.

Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.

BJ Services Company, *Aquacon, Product Information*, Aug. 1, 2001, pp. 1-2.

BJ Services Company, *Aquatrol I, Product Information*, Dec. 14, 2000, pp. 1-2.

Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13 (previously listed as website address, SPE eLibrary).

Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14 (previously listed as website address, SPE eLibrary).

* cited by examiner

METHODS USEFUL FOR CONTROLLING FLUID LOSS DURING SAND CONTROL OPERATIONS

BACKGROUND

The present invention relates to methods useful during sand control operations and, more particularly, to using water-soluble relative permeability modifiers that are useful for controlling fluid loss during sand control operations.

Hydrocarbon wells are often located in sections of subterranean formations that contain unconsolidated formation particulates that may migrate out of the subterranean formation with the oil, gas, water, and/or other fluids produced by the wells. The presence of formation particulates, such as formation sand, in produced fluids is undesirable in that the formation particulates may abrade pumping and other producing equipment and reduce the fluid production capabilities of the producing zones. As referred to herein, "unconsolidated formation particulates" include loose formation particulates and those wherein the bonded formation particulates cannot withstand the forces produced by the production of fluids therethrough.

Different techniques of controlling formation particulates have been developed and are commonly referred to as "sand control operations." One common technique for performing a sand control operation is gravel packing. Gravel packing operations may be performed in horizontal, vertical, inclined, or otherwise formed portions of wells. Gravel packing operations typically use viscosified carrier fluids to suspend gravel particulates for delivery to a desired area in a well bore, e.g., near sections of a subterranean formation that contains unconsolidated formation particulates. In some horizontal wells, no viscosifying agents may be placed into the carrier fluid and high pumping rates may be used to deliver the gravel particulates to the desired location. Gravel particulates used during a gravel pack operation may be of a specific size designed to prevent the passage of formation particulates. One common type of gravel packing operation involves placing a gravel pack screen in the well bore and packing the annulus between the screen and the well bore with gravel particulates. Once in place, the gravel particulates act, inter alia, to prevent the formation particulates from occluding the screen or migrating with the produced fluids, and the screen acts, inter alia, to prevent the placed gravel particulates from entering the production tubing. After the gravel particulates have been placed in the desired location, the carrier fluid leaks off into the formation, inter alia, to allow the gravel particulates to settle into a gravel pack. Subsequently, the viscosity of the carrier fluid may be reduced (if needed), the well may be put back into production, and the carrier fluid may be produced back from the well. Other types of gravel packing operations may involve the use of gravel particulates coated with a resin or tackifying composition, wherein the gravel particulates may form hard, permeable masses therein to reduce the migration of formation particulates. In some instances, the processes of fracturing and gravel packing may be combined into a single treatment to provide a stimulated production and an annular gravel pack to prevent the migration of formation particulates. Such treatments are often referred to as "frac pack" operations.

A problem often encountered during sand control operations is excessive fluid loss into the formation. For example, during gravel pack operations and frac pack operations excessive fluid loss into the formation may cause a premature sandout to occur. As used herein, "premature sandout" refers to an undesired agglomeration of gravel particulates that can block the progress of the additional gravel particulates necessary to form the desired gravel pack. To prevent a premature sandout from occurring, fluid loss control additives commonly are included in the carrier fluids. Examples of commonly used fluid loss control additives include, but are not limited to, gelling agents, such as hydroxyethylcellulose and xanthan. Additional fluid loss control may be provided by crosslinking the gelling agent or by including sized solids in the carrier fluid, such as calcium carbonate.

A variety of service tools may be used during sand control operations, whereby removal of these service tools from the production packer after the sand control operation is necessitated. To prevent fluid loss into the formation during removal of these service tools, mechanical devices, such as flapper valves, may be used. In some instances, however, these mechanical devices may fail or otherwise cannot be used. In these instances, chemical fluid loss control pills may be used as supplements to the mechanical devices or as contingencies in case of their failure.

Conventional chemical fluid loss control pills may be characterized as either solids-containing pills or solids-free pills. Examples of solids-containing pills include sized-salt pills and sized-carbonate pills. These solids-containing pills often are not optimized for the particular downhole hardware and conditions that may be encountered. For instance, the particle sizes of the solids may not be optimized for particular gravel pack screen openings and, as a result, may invade into the interior of the gravel pack screen, which may greatly increase the difficulty of removal by subsequent remedial treatments. Additionally, high-solids loading in the pills, in conjunction with the large volumes of these pills needed to control fluid losses, may lead to the plugging of the interior and exterior of the gravel pack screen, which also may greatly increase the complexity of subsequent clean up. Furthermore, high loading of starches and biopolymers in the sized salt pills may add to the difficulty of cleanup either by flowback or remedial treatments. Solids-free fluid loss control pills commonly comprise crosslinked polymers that may not be effective without some invasion into the gravel pack screen and formation matrix. These pills typically require large volumes to control fluid loss and remedial treatments to remove.

Once fluid loss control may be no longer required, remedial treatments may be required to remove the previously placed pills, inter alia, so that the wells may be placed into production. For example, a chemical breaker, such as an acid, oxidizer, or enzyme may be used to either dissolve the solids or reduce the viscosity of the pill. In many instances, however, use of a chemical breaker to remove the pill from inside the screen may be either ineffective or not a viable economic option. Furthermore, the chemical breakers may be corrosive to the gravel pack screens and other downhole tools. Additionally, as the chemical breakers leak off into the formation, they may carry undissolved fines that may plug and/or damage the formation or may produce undesirable reactions with the formation matrix.

SUMMARY

The present invention relates to methods useful during sand control operations and, more particularly, to using water-soluble relative permeability modifiers that are useful for controlling fluid loss during sand control operations.

In one embodiment, the present invention provides a method of providing fluid loss control during sand control operations comprising introducing a fluid that comprises a water-soluble relative permeability modifier into a well bore; and stabilizing unconsolidated formation particulates in a section of a subterranean formation penetrated by the well bore.

In another embodiment, the present invention provides a method of reducing fluid loss from a carrier fluid used in sand control operations comprising adding a water-soluble relative permeability modifier to the carrier fluid.

In another embodiment, the present invention provides a method of providing sand control in a section of a subterranean formation penetrated by a well bore comprising providing a carrier fluid that comprises an aqueous-based component, a water-soluble relative permeability modifier, and gravel particulates; and introducing the carrier fluid into the well bore, such that the gravel particulates form a gravel pack in or neighboring the section of the subterranean formation.

Other and further features and advantages of the present invention will be readily apparent to those skilled in the art upon a reading of the detailed description that follows.

DETAILED DESCRIPTION

The present invention relates to methods useful during sand control operations and, more particularly, to using water-soluble relative permeability modifiers that are useful for controlling fluid loss during sand control operations. As used herein, "water-soluble" refers to at least 0.01 weight percent soluble in distilled water. The methods and compositions of the present invention may be utilized in horizontal, vertical, inclined, or otherwise formed portions of wells.

The treatment fluids of the present invention generally comprise an aqueous-based component and a water-soluble relative permeability modifier. A variety of additives suitable for use in the chosen operation may be included in the treatment fluids as desired. In some embodiments, the treatment fluids may be carrier fluids used in gravel pack or frac pack operations. In other embodiments, the treatment fluids may be pills that are placed into the well bore either prior to or after a gravel pack or a frac pack operation, inter alia, to provide fluid loss control.

The aqueous-based component of the treatment fluids of the present invention may include fresh water, saltwater, brine (e.g., saturated saltwater), or seawater. Generally, the water may be from any source provided that it does not contain components that may adversely affect other components in the treatment fluid.

As used herein, "relative permeability modifier" refers to a compound that is capable of reducing the permeability of a subterranean formation to aqueous-based fluids without substantially changing its permeability to hydrocarbons. Generally, the water-soluble relative permeability modifiers of the present invention may be any suitable water-soluble relative permeability modifier that is suitable for use in subterranean operations. In some embodiments of the present invention, the water-soluble relative permeability modifiers comprise a hydrophobically modified polymer. As used herein, "hydrophobically modified" refers to the incorporation into the hydrophilic polymer structure of hydrophobic groups, wherein the alkyl chain length is from about 4 to about 22 carbons. In other embodiments of the present invention, the water-soluble relative permeability modifiers comprise a hydrophilically modified polymer. As used herein, "hydrophilically modified" refers to the incorporation into the hydrophilic polymer structure of hydrophilic groups. In yet another embodiment of the present invention, the water-soluble relative permeability modifiers comprise a water-soluble polymer without hydrophobic or hydrophilic modification.

The hydrophobically modified polymers of the present invention typically have molecular weights in the range of from about 100,000 to about 10,000,000. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone, the polymer backbone comprising polar heteroatoms. Generally, the polar heteroatoms present within the polymer backbone of the hydrophobically modified polymers include, but are not limited to, oxygen, nitrogen, sulfur, or phosphorous.

In certain embodiments of the present invention, the hydrophobically modified polymers may be a reaction product of a hydrophilic polymer and a hydrophobic compound. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In certain embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In certain embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In other embodiments, the hydrophobically modified polymers used in the present invention may be prepared from the polymerization reaction of at least one hydrophilic monomer and at least one hydrophobically modified hydrophilic monomer. Examples of suitable methods of their preparation are described in U.S. Pat. No. 6,476,169, the relevant disclosure of which is incorporated herein by reference.

A variety of hydrophilic monomers may be used to form the hydrophobically modified polymers useful in the present invention. Examples of suitable hydrophilic monomers include, but are not limited to homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

The hydrophobically modified polymers formed from the above-described polymerization reaction may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10. Suitable hydrophobically modified polymers having molecular weights and mole ratios in the ranges set forth above include, but are not limited to, acrylamide/octadecyldimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylamide/2-acrylamido-2-methyl propane sulfonic acid/2-ethylhexyl methacrylate terpolymer.

In other embodiments of the present invention, the water-soluble relative permeability modifiers of the present invention comprise a hydrophilically modified polymer. The hydrophilically modified polymers of the present invention typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

In certain embodiments of the present invention, the hydrophilically modified polymer may be a reaction product of a hydrophilic polymer and a hydrophilic compound. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens; sulfonates; sulfates; and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

In yet other embodiments of the present invention, the water-soluble relative permeability modifiers comprise a water-soluble polymer without hydrophobic or hydrophilic modification. Examples of suitable water-soluble polymers without hydrophobic or hydrophilic modification include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

Sufficient concentrations of a suitable water-soluble relative permeability modifier should be present in the treatment fluids of the present invention to provide the desired level of fluid loss control. In some embodiments, the water-soluble relative permeability modifier should be included in the treatment fluids of the present invention in an amount in the range of from about 0.02% to about 10% by weight of the treatment fluid. Even further, in certain embodiments, the water-soluble relative permeability modifier should be present in the treatment fluids of the present invention in an amount in the range of from about 0.05% to about 1.0% by weight of the treatment fluid. In certain embodiments of the present invention, the water-soluble relative permeability modifier may be provided in a concentrated aqueous solution prior to its combination with the other components necessary to form the treatment fluids of the present invention.

The treatment fluids of the present invention optionally may comprise gravel particulates suitable for use in subterranean applications. Suitable gravel particulates include, but are not limited to, gravel, natural sand, quartz sand, particulate garnet, glass, ground walnut hulls, nylon pellets, aluminum pellets, bauxite, ceramics, and polymeric materials, and combinations thereof. One having ordinary skill in the art, with the benefit of this disclosure, will recognize the particulate type, size, and amount to use in conjunction with the treatment fluids of the present invention to achieve a desired result. In certain embodiments, the gravel particulates used may be included in the treatment fluids to form a gravel pack downhole. In some embodiments, the gravel particulates may be coated with a resin or tackifying composition, wherein the gravel particulates may form hard, permeable masses in the formation, inter alia, to reduce the migration of formation particulates.

Additional additives may be added to the treatment fluids of the present invention as deemed appropriate for a particular application by one skilled in the art with the benefit of this disclosure. Examples of such additives include, but are not limited to, weighting agents, surfactants, scale inhibitors, antifoaming agents, bactericides, salts, foaming agents, conventional fluid loss control additives, viscosifying agents, gel breakers, shale swelling inhibitors, and combinations thereof.

The treatment fluids of the present invention may be used in a variety of sand control operations where it is desirable to provide fluid loss control. In some embodiments, where the treatment fluids of the present invention are used with gravel packing and frac packing operations, carrier fluids that comprise an aqueous component, a water-soluble relative permeability modifier, and gravel particulates may be introduced into a well bore so as to create a gravel pack. In certain embodiments, the carrier fluids of the present invention further may comprise a viscosifying agent to suspend the gravel particulates therein. In other embodiments, no viscosifying agents may be included in the carrier fluids of the present invention to suspend the gravel particulates. In these embodiments, where no viscosifying agent is included in the carrier fluid, the pumping rates of the carrier fluid must be sufficient to place the gravel particulates into the desired location for the gravel pack without the use of viscosifying agents to suspend the gravel particulates in the carrier fluid. In one embodiment, the carrier fluid does not comprise a viscosifying agent where the well bore is horizontal. Among other things, the water-soluble relative permeability modifiers present in the carrier fluid may act to reduce fluid loss from the carrier fluid into the subterranean formation. Furthermore, the water-soluble relative permeability modifier may attach to the gravel particulates placed into the well bore, and to surfaces within the subterranean formation during normal leak off from the carrier fluid. The presence of the water-soluble relative permeability modifiers on the gravel particulates and in the formation may reduce the permeability of those areas to aqueous-based fluids without substantially changing the permeability to hydrocarbons. This may reduce fluid loss into the formation from other fluids (e.g., completion fluids) that may be introduced into the well bore subsequent to the carrier fluid and reduce the subsequent problems associated with water flowing into the well bore from the subterranean formation.

In other embodiments, the treatment fluids of the present invention may be placed into the well bore as a pill either prior to or after the stabilization of unconsolidated formation particulates in a section of the subterranean formation penetrated by the well bore. The formation particulates may be stabilized by any suitable technique, including gravel packing and frac packing. In these embodiments, treatment fluids of the present invention that comprise an aqueous-based component and a water-soluble relative permeability modifier may be introduced to the well bore that penetrates the section of the subterranean formation to be stabilized. The desired volume of the treatment fluid of the present invention introduced into the well bore is based, inter alia, on several properties of the section to be treated, such as depth and volume of the section, as well as permeability and other physical properties of material in the section. Among other things, the water-soluble relative permeability modifier included in the treatment fluid of the present invention may attach to surfaces within the subterranean formation during normal leak off from the carrier fluid or to gravel particulates that may have been placed into the well bore. The presence of the water-soluble relative permeability modifiers on the gravel particulates and/or in the formation may reduce the permeability of those areas to aqueous-based fluids without substantially changing the permeability to hydrocarbons. This may reduce fluid loss into the formation from other fluids (e.g., carrier fluids or completion fluids) that may be introduced into the well bore subsequent to the treatment fluid and reduce the subsequent problems associated with water flowing into the well bore from the subterranean formation.

In one embodiment, the present invention provides a method of providing fluid loss control during sand control operations comprising introducing a fluid that comprises a water-soluble relative permeability modifier into a well bore; and stabilizing unconsolidated formation particulates in a section of a subterranean formation penetrated by the well bore.

In another embodiment, the present invention provides a method of reducing fluid loss from a carrier fluid used in sand control operations comprising adding a water-soluble relative permeability modifier to the carrier fluid.

In another embodiment, the present invention provides a method of providing sand control in a section of a subterranean formation penetrated by a well bore comprising providing a carrier fluid that comprises an aqueous-based component, a water-soluble relative permeability modifier, and gravel particulates; and introducing the carrier fluid into the well bore, such that the gravel particulates form a gravel pack in or neighboring the section of the subterranean formation.

To facilitate a better understanding of the present invention, the following examples of preferred embodiments are given. In no way should the following examples be read to limit, or to define, the scope of the invention.

EXAMPLES

Example 1

A water-soluble relative permeability modifier of the present invention was made by mixing 47.7 grams ("g") of deionized water, 0.38 g of (n-hexadecyl) dimethylammonium ethyl methacrylate bromide, and 1.1 g of acrylamide, and sparging with nitrogen for approximately 30 minutes. Thereafter, a polymerization initiator, such as 0.0127 g of 2,2'-azo bis (2-amidinopropane) dihydrochloride was added. The resulting solution was then heated, with stirring, to 110° F. and held for 18 hours to produce a highly viscous polymer solution, a water-soluble relative permeability modifier of the present invention.

Example 2

A water-soluble relative permeability modifier of the present invention was made by mixing 41.2 g of deionized water, 0.06 g of octadecyl methacrylate, 0.45 g of cocoamidopropyl betaine surfactant, and 1.26 g of acrylamide. Thereafter, a polymerization initiator, such as 0.0127 g of 2,2'-azo bis (2-amidinopropane) dihydrochloride was added. The resulting solution was then heated, with stirring, to 110° F. and held for 18 hours to produce a highly viscous polymer solution, a water-soluble relative permeability modifier of the present invention.

Example 3

A water-soluble relative permeability modifier of the present invention was made as follows. First, a polymer was made by mixing 1968 g of deionized water, 105 g of dimethylaminoethyl methacrylate ("DMEMA") and sparging with nitrogen for 30 minutes. Thereafter, the pH was adjusted to approximately 7.9 with sulfuric acid and a polymerization initiator, such as 0.46 g of 2,2'-azo bis(2-amidinopropane) dihydrochloride was added. The resulting solution was then heated, with stirring, to 110° F. and held for 18 hours to produce poly-DMEMA.

The poly-DMEMA was then hydrophobically modified by adding 71.0 g of poly-DMEMA to a 250 ml round flask, followed by 15% NaOH to achieve a pH of approximately 8.9. Next, 54.6 g of water, 0.36 g of C16 alkyl (n-hexadecyl) bromide, and 0.39 g of benzylcetyldimethylammonium bromide surfactant were added to quaternize the poly-DMEMA homopolymer and form a DMEMA-n-hexadecyl alkyl-DMEMA copolymer. This mixture was then heated, with stirring, to 140° F. and held for 24 hours to produce a highly viscous polymer solution, a water-soluble relative permeability modifier of the present invention.

Example 4

Fluid loss control tests were performed using a hollow Berea sandstone core with the following dimensions: 2.75-inch length, 2.5-inch outer diameter, 1-inch inner diameter. The Berea sandstone core was mounted in a cell in which fluids can be pumped through the core in two directions. In one direction, defined herein as the "production direction" fluid is flowed from the exterior of the core, through the core, and into the hollow interior. Fluid also may be flowed in the direction opposite the production direction so that fluid is flowed from the hollow interior of the core, through the core, and to the exterior of the core. Fluid flowing opposite the production direction represents fluid loss from a well bore into the formation. Two treatment solutions were prepared for this series of tests.

The sample fluid used in Test No. 1 (comparative) was an aqueous solution that comprised 10% acetic acid by weight and 1% of a cocoamido propyl betaine surfactant by weight. Test No. 1 was performed at room temperature.

The sample fluid used in Tests No. 2 and No. 3 was an aqueous solution that comprised 10% acetic acid by weight, 0.2% of a water-soluble relative permeability modifier of the present invention by weight, and 1% of a cocoamido propyl betaine surfactant by weight. The water-soluble relative permeability modifier was a DMEMA-n-hexadecyl alkyl-DMEMA copolymer prepared as described in Example 3. Test No. 2 was performed at room temperature, and Test No. 3 was performed at 175° F.

The following procedure was used for this series of tests. For each test, the core experienced a flow sequence of 1) brine, 2) kerosene, 3) drilling mud (to build a filter cake), 4) sample fluid, 5) kerosene. The first flow step, brine, was in the production direction and prepared the core for the test. The brine used in the first flow step was a 7% by weight KCl brine. Next, in the second flow step, the kerosene was flowed in the production direction at a constant rate until the pressure stabilized, and the initial permeability of the core was calculated. Thereafter, in the third flow step, a sample drilling mud was placed in the hollow interior of the core and pressure was applied, such that a drilling fluid filter cake was formed on the inner surface of the core. After formation of the drilling fluid filter cake, in the fourth flow step, the sample fluid was placed in the inner hole, and a constant pressure of 120 psi was applied. The filtrate loss from the sample fluid was then measured as a function of time. In the fifth flow step, kerosene was flowed at the same rate and the final permeability of the core was calculated. For each series of tests, the initial and final permeability of the core to kerosene was essentially unchanged. Table 1 contains the data for this series of tests.

TABLE 1

| Test | Polymer Concentration | Filtrate Loss (ml) at Given Time (hours) | | | | |
|---|---|---|---|---|---|---|
| | | 1 hour | 2 hours | 4 hours | 5 hours | 5.2 hours |
| No. 1 @ room temperature | N/A | 1.4 | 2.1 | 7.6 | 50.2 | 90.0 |
| No. 2 @ room temperature | 2000 ppm | 0.5 | 1.1 | 1.9 | 2.3 | 2.4 |
| No. 3 @ 175° F. | 2000 ppm | 2.0 | 4.9 | 9.1 | 10.5 | 10.8 |

Accordingly, this example indicates that a water soluble relative permeability modifier of the present invention may be useful for controlling fluid loss from a well bore into a subterranean formation.

Example 5

A water-soluble relative permeability modifier of the present invention was made as follows. First, a polymer was made by mixing 45.0 g of dimethylaminoethyl methacrylate, 6.8 g acrylic acid, 372.0 g of water and sparging with nitrogen for 30 minutes. Thereafter, the pH was adjusted to approximately 5.3 with 5.7 mL of concentrated sulfuric acid, followed by the addition of 0.2 mL of 2-mercaptoethanol and 1.3 g of 2,2'-azo bis (2-amidinopropane) dihydrochloride. The resulting solution was then heated to 71° C., with stirring, and held for 18 hours to produce poly(dimethylaminoethyl methacrylate/acrylic acid).

The poly(dimethylaminoethyl methacrylate/acrylic acid) was then hydrophilically modified by adding 95.0 g of the polymer to a 250 mL roundbottom flask, followed by the addition of 5.7 g of a 65% solution of an epichlorohydrin-terminated polyethylene oxide methyl ether and 8.0 g of sodium chloride. Approximately 17 mL of 3% active sodium hydroxide solution was then added to reach a pH of approximately 8.2. The mixture was then heated, with stirring, to 71° C. The viscosity of the solution was monitored, and when the viscosity reached 2000 centipoise (as measured with a Brookfield LVT viscometer, #2 spindle at 12 rpm, 25° C.) the reaction was terminated by removing the heat source and adding 5 mL of 17% hydrochloric acid, 2.0 g sodium chloride and 14.7 g water.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of providing fluid loss control during sand control operations comprising:

introducing a fluid that comprises a water-soluble relative permeability modifier into a well bore; and stabilizing unconsolidated formation particulates in a section of a subterranean formation penetrated by the well bore.

2. The method of claim 1 wherein introducing the fluid occurs after stabilizing the unconsolidated formation particulates.

3. The method of claim 1 wherein the water-soluble relative permeability modifier comprises a hydrophobically modified polymer.

4. The method of claim 3 wherein the hydrophobically modified polymer has a molecular weight in the range of from about 100,000 to about 10,000,000.

5. The method of claim 3 wherein the hydrophobically modified polymer comprises a polymer backbone, the polymer backbone comprising polar heteroatoms.

6. The method of claim 3 wherein the hydrophobically modified polymer is a reaction product of a hydrophobic compound and a hydrophilic polymer.

7. The method of claim 6 wherein the hydrophobically modified polymer has a mole ratio of a hydrophilic monomer to the hydrophobic compound in the range of from about 99.98:0.02 to about 90:10, wherein the hydrophilic monomer is a calculated amount present in the hydrophilic polymer.

8. The method of claim 6 wherein the hydrophilic polymer is a homopolymer, a copolymer, or a terpolymer.

9. The method of claim 6 wherein the hydrophilic polymer comprises a polymer backbone and a reactive amino group in the polymer backbone or as a pendant group, the reactive amino group capable of reacting with the hydrophobic compound.

10. The method of claim 6 wherein the hydrophilic polymer comprises a dialkyl amino pendant group.

11. The method of claim 6 wherein the hydrophilic polymer comprises a dimethyl amino pendant group and at least one monomer comprising dimethylaminoethyl methacrylate or dimethylaminopropyl methacrylamide.

12. The method of claim 6 wherein the hydrophilic polymer comprises a polyacrylamide, a polyvinylamine, a poly(vinylamine/vinyl alcohol), or an alkyl acrylate polymer.

13. The method of claim 12 wherein the alkyl acrylate polymer is polydimethylaminoethyl methacrylate, polydimethylaminopropyl methacrylamide, poly(acrylamide/dimethylaminoethyl methacrylate), poly(acrylic acid/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), or poly(methacrylic acid/dimethylaminopropyl methacrylamide).

14. The method of claim 6 wherein the hydrophilic polymer comprises a cellulose, a chitosan, a polyamide, a polyetheramine, a polyethyleneimine, a polyhydroxyetheramine, a polylysine, a polysulfone, a gum, a starch, or a derivative thereof.

15. The method of claim 6 wherein the hydrophobic compound comprises an alkyl halide, a sulfonate, a sulfate, or an organic acid derivative.

16. The method of claim 15 wherein the organic acid derivative comprises an octenyl succinic acid; a dodecenyl succinic acid; an anhydride of octenyl succinic acid; an ester of octenyl succinic acid; an amide of octenyl succinic acid;

an anhydride of dodecenyl succinic acid; an ester of dodecenyl succinic acid; or an amide of dodecenyl succinic acid.

17. The method of claim 3 wherein the hydrophobically modified polymer is prepared from a polymerization reaction of at least one hydrophilic monomer and at least one hydrophobically modified hydrophilic monomer.

18. The method of claim 17 wherein the hydrophilic monomer comprises acrylamide; 2-acrylamido-2-methyl propane sulfonic acid; N,N-dimethylacrylamide; vinyl pyrrolidone; dimethylaminoethyl methacrylate; acrylic acid; dimethylaminopropylmethacrylamide; vinyl amine; vinyl acetate; trimethylammoniumethyl methacrylate chloride; methacrylamide; hydroxyethyl acrylate; vinyl sulfonic acid; vinyl phosphonic acid; methacrylic acid; vinyl caprolactam; N-vinylformamide; N,N-diallylacetamide; dimethyldiallyl ammonium halide; itaconic acid; styrene sulfonic acid; methacrylamidoethyltrimethyl ammonium halide; a quaternary salt derivative of acrylamide; or a quaternary salt derivative of acrylic acid.

19. The method of claim 17 wherein the hydrophobically modified hydrophilic monomer comprises an alkyl acrylate, an alkyl methacrylate, an alkyl acrylamide, an alkyl methacrylamide, an alkyl dimethylammoniumethyl methacrylate halide, or an alkyl dimethylammoniumpropyl methacrylamide halide, wherein the alkyl groups have from about 4 to about 22 carbon atoms.

20. The method of claim 17 wherein the mole ratio of the hydrophilic monomer to the hydrophobically modified hydrophilic monomer in the hydrophobically modified polymer is in the range of from about 99.98:0.02 to about 90:10.

21. The method of claim 1 wherein the water-soluble relative permeability modifier comprises a hydrophilically modified polymer.

22. The method of claim 21 wherein the hydrophilically modified polymer has a molecular weight in the range of from about 100,000 to about 10,000,000.

23. The method of claim 21 wherein the hydrophilically modified polymer comprises a polymer backbone, the polymer backbone comprising polar heteroatoms.

24. The method of claim 21 wherein the hydrophilically modified polymer is a reaction product of a hydrophilic polymer and a hydrophilic compound.

25. The method of claim 24 wherein the hydrophilically modified polymer has a weight ratio of the hydrophilic polymer to the hydrophilic compound in the range of from about 1:1 to about 10:1.

26. The method of claim 24 wherein the hydrophilic polymer is a homopolymer, a copolymer, or a terpolymer.

27. The method of claim 24 wherein the hydrophilic polymer comprises a polymer backbone and a reactive amino group in the polymer backbone or as a pendant group, the reactive amino group capable of reacting with the hydrophobic compound.

28. The method of claim 24 wherein the hydrophilic polymer comprises a dialkyl amino pendant group.

29. The method of claim 24 wherein the hydrophilic polymer comprises a dimethyl amino pendant group and at least one monomer comprising dimethylaminoethyl methacrylate or dimethylaminopropyl methacrylamide.

30. The method of claim 24 wherein the hydrophilic polymer comprises a polyacrylamide, a polyvinylamine, a poly(vinylamine/vinyl alcohol), or an alkyl acrylate polymer.

31. The method of claim 30 wherein the alkyl acrylate polymer is polydimethylaminoethyl methacrylate, polydimethylaminopropyl methacrylamide, poly(acrylamide/dimethylaminoethyl methacrylate), poly(acrylic acid/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), or poly(methacrylic acid/dimethylaminopropyl methacrylamide).

32. The method of claim 24 wherein the hydrophilic polymer comprises a cellulose, a chitosan, a polyamide, a polyetheramine, a polyethyleneimine, a polyhydroxyetheramine, a polylysine, a polysulfone, a gum, a starch, or a derivative thereof.

33. The method of claim 24 wherein the hydrophilic compound comprises a polyether comprising a halogen; a sulfonate; a sulfate; or an organic acid derivative.

34. The method of claim 33 wherein the polyether comprises a polyethylene oxide, a polypropylene oxide, or a polybutylene oxide, or a copolymer, a terpolymer, or a mixture thereof.

35. The method of claim 33 wherein the polyether comprises an epichlorohydrin-terminated polyethylene oxide methyl ether.

36. The method of claim 24 wherein the hydrophilically modified polymer is a reaction product of an epichlorohydrin-terminated polyethylene oxide methyl ether and polydimethylaminoethyl methacrylate, the hydrophilically modified polymer having a weight ratio of polydimethylaminoethyl methacrylate to epichlorohydrin-terminated polyethyleneoxide methyl ether of about 3:1.

37. The method of claim 24 wherein the hydrophilically modified polymer is a reaction product of polydimethylaminoethyl methacrylate and epichlorohydrin-terminated polyethyleneoxide methyl ether; a reaction product of polydimethylaminopropyl methacrylamide and epichlorohydrin-terminated polyethyleneoxide methyl ether; or a reaction product of poly(acrylamide/dimethylaminopropyl methacrylamide) and epichlorohydrin-terminated polyethyleneoxide methyl ether.

38. The method of claim 1 wherein the water-soluble relative permeability modifier comprises a homo-, co-, or terpolymer of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, a quaternary salt derivative of acrylamide, or a quaternary salt derivative of acrylic acid.

39. The method of claim 1 wherein the water-soluble relative permeability modifier is present in the fluid in an amount in the range of from about 0.02% to about 10% by weight of the fluid.

40. A method of reducing fluid loss from a carrier fluid used in sand control operations comprising adding a water-soluble relative permeability modifier to the carrier fluid.

41. The method of claim 40 wherein the water-soluble relative permeability modifier comprises a hydrophobically modified polymer.

42. The method of claim 40 wherein the water-soluble relative permeability modifier comprises a hydrophilically modified polymer.

43. The method of claim 40 wherein the water-soluble relative permeability modifier comprises a homo-, co-, or terpolymer of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, a quaternary salt derivative of acrylamide, or a quaternary salt derivative of acrylic acid.

44. A method of providing sand control in a section of a subterranean formation penetrated by a well bore comprising:
providing a carrier fluid that comprises:
an aqueous-based component,
a water-soluble relative permeability modifier, and
gravel particulates; and
introducing the carrier fluid into the well bore, such that the gravel particulates form a gravel pack in or neighboring the section of the subterranean formation.

45. The method of claim 44 wherein the carrier fluid is introduced into the well bore at a pressure sufficient to create or enhance at least one fracture in the subterranean formation.

46. The method of claim 44 wherein the water-soluble relative permeability modifier comprises a hydrophobically modified polymer.

47. The method of claim 46 wherein the hydrophobically modified polymer is a reaction product of a hydrophobic compound and a hydrophilic polymer.

48. The method of claim 47 wherein the hydrophilic polymer comprises a polyacrylamide, a polyvinylamine, a poly(vinylamine/vinyl alcohol), or an alkyl acrylate polymer.

49. The method of claim 47 wherein the hydrophilic polymer comprises a cellulose, a chitosan, a polyamide, a polyetheramine, a polyethyleneimine, a polyhydroxyetheramine, a polylysine, a polysulfone, or a starch, or a derivative thereof.

50. The method of claim 47 wherein the hydrophobic compound comprises an alkyl halide, a sulfonate, a sulfate, or an organic acid derivative.

51. The method of claim 50 wherein the organic acid derivative comprises an octenyl succinic acid; a dodecenyl succinic acid; an anhydride of octenyl succinic acid; an ester of octenyl succinic acid; an amide of octenyl succinic acid; an anhydride of dodecenyl succinic acid; an ester of dodecenyl succinic acid; or an amide of dodecenyl succinic acid.

52. The method of claim 46 wherein the hydrophobically modified polymer is prepared from a polymerization reaction of at least one hydrophilic monomer and at least one hydrophobically modified hydrophilic monomer.

53. The method of claim 44 wherein the water-soluble relative permeability modifier comprises a hydrophilically modified polymer.

54. The method of claim 53 wherein the hydrophilically modified polymer is a reaction product of a hydrophilic polymer and a hydrophilic compound.

55. The method of claim 54 wherein the hydrophilic polymer comprises a polyacrylamide, a polyvinylamine, a poly(vinylamine/vinyl alcohol), or an alkyl acrylate polymer.

56. The method of claim 54 wherein the hydrophilic polymer comprises a cellulose, a chitosan, a polyamide, a polyetheramine, a polyethyleneimine, a polyhydroxyetheramine, a polylysine, a polysulfone, a gum, a starch, or a derivative thereof.

57. The method of claim 54 wherein the hydrophilic compound comprises a polyether comprising a halogen; a sulfonate; a sulfate; or an organic acid derivative.

58. The method of claim 57 wherein the polyether comprises a polyethylene oxide, a polypropylene oxide, or a polybutylene oxide, or a copolymer, a terpolymer, or a mixture thereof.

59. The method of claim 57 wherein the polyether comprises an epichlorohydrin-terminated polyethylene oxide methyl ether.

60. The method of claim 44 wherein the water-soluble relative permeability modifier comprises a homo-, co-, or terpolymer of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, a quaternary salt derivative of acrylamide, or a quaternary salt derivative of acrylic acid.

61. The method of claim 44 wherein the water-soluble relative permeability modifier is present in the carrier fluid in an amount in the range of from about 0.02% to about 10% by weight of the carrier fluid.

* * * * *